United States Patent
Hoffmann et al.

(10) Patent No.: US 6,236,190 B1
(45) Date of Patent: May 22, 2001

(54) METHOD AND DEVICE FOR DRIVING A CAPACITIVE ACTUATOR

(75) Inventors: Christian Hoffmann, Regensburg; Hellmut Freudenberg, Grossberg; Hartmut Gerken, Nittendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/299,367

(22) Filed: Apr. 26, 1999

Related U.S. Application Data

(63) Continuation of application No. PCT/DE97/02151, filed on Sep. 22, 1997.

(30) Foreign Application Priority Data

Oct. 25, 1996 (DE) .............................. 196 44 521

(51) Int. Cl.⁷ .............................. H02J 7/16; H01L 41/08
(52) U.S. Cl. .............................. 320/166; 310/317
(58) Field of Search .............................. 320/166, 167; 310/316, 317

(56) References Cited

U.S. PATENT DOCUMENTS

| | | | |
|---|---|---|---|
| 4,749,897 | * 6/1988 | Natsume et al. | 310/317 |
| 4,765,140 | * 8/1988 | Imoto et al. | 310/328 |
| 5,361,014 | * 11/1994 | Antone et al. | 310/317 |
| 5,425,343 | * 6/1995 | Akaki et al. | 310/317 |
| 5,477,831 | * 12/1995 | Akaki et al. | 310/316.03 |
| 5,479,062 | 12/1995 | Yoshino | 310/317 |
| 5,543,679 | 8/1996 | Morino et al. | 310/317 |
| 5,635,788 | * 6/1997 | Soltermann et al. | 310/317 |
| 5,895,998 | * 4/1999 | Saylor | 310/317 |

OTHER PUBLICATIONS

Patent Abstracts of Japan No. 06–140682 A (Hirotada), dated May 20, 1994.
Patent Abstracts of Japan No. 05–344755 A (Mitsuyasu), dated Dec. 24, 1993.
Patent Abstracts of Japan No. 63–204674 A (Suzuki), dated Aug. 24, 1988.
Patent Abstracts of Japan No. 62–210241 A (Natsume), dated Sep. 16, 1987.

* cited by examiner

*Primary Examiner*—Peter S. Wong
*Assistant Examiner*—Pia Tibbits
(74) *Attorney, Agent, or Firm*—Herbert L. Lerner; Laurence A. Greenberg; Werner H. Stemer

(57) ABSTRACT

A constant displacement ds of a capacitive actuator, for instance a capacitor for a fuel injection valve of an internal combustion engine, is obtained within a wide temperature range. While the actuator is being charged, its current and the voltage across the actuator are multiplied with one another. The product of the current and the voltage are integrated and the integration value is compared with a predetermined setpoint value. The process of charging is interrupted when the integration value reaches or exceeds the actual value. In an alternative embodiment, the actuator is charged from a constant current source and only the voltage drop is integrated.

10 Claims, 2 Drawing Sheets

METHOD AND DEVICE FOR DRIVING A CAPACITIVE ACTUATOR

CROSS-REFERENCE TO RELATED APPLICATION

This application is a continuation of copending international application PCT/DE97/02151, filed Sep. 22, 1997, which designated the United States.

BACKGROUND OF THE INVENTION

Field of the Invention

The invention relates to a method and device for driving a capacitive actuator, in particular a piezoelectric-operated fuel injection valve of an internal combustion engine.

Piezo actuators consist of a multiplicity of piezo-ceramic layers that form a so-called "stack." The stack changes its dimensions when a voltage is applied, in particular, it changes its length s by a displacement ds, or it produces an electric voltage on mechanical stress or tension.

Various methods are known for driving piezo actuators, which behave electrically as capacitors. In those methods the voltage applied to the piezo actuator is monitored. In all prior art methods, the criterion used for terminating the charging is when a specific voltage across the piezo actuator is reached, unless an elaborate measurement of the relevant actuator displacement ds is provided. One example of this is a prior German patent application No. 1932872-1.

The electrical properties of a piezo stack of the foregoing type change with the temperature to which it is exposed. With increasing temperature, its capacitance increases, and the displacement increases as well. At temperatures, from about −40° C. to +150° C., which are meant to be taken into account for automotive applications, changes of up to a factor of 2 may in this case be observed.

If a piezo actuator is charged, at all operating points, for example to a constant voltage, which brings about the requisite displacement ds at low temperatures, then the displacement attained at high temperatures is considerably greater than necessary. In the context of fuel injection valves with constant fuel pressure, this leads to an excessive amount of fuel, or vice versa. Since the capacitance of the piezo stack is likewise greater at high temperatures, very much more charge and energy ($E=\frac{1}{2}C \cdot U^2$) than necessary is required.

U.S. Pat. No. 5,387,834 discloses a drive circuit for a piezoelectric element of a dot matrix printer, in which a temperature sensor senses the temperature of the piezoelectric element. The piezoelectric element is driven using charging times which are stored in a table as a function of the temperature.

U.S. Pat. No. 5,543,679 discloses a drive circuit for a piezoelectric element for driving a fuel valve. A presumably constant charge is drawn from a capacitor and supplied to the piezoelectric element via a transformer. None of the variations in the circuit due to temperature changes, humidity, component tolerances, aging, and the like are thereby taken into consideration.

Patent Abstracts of Japan, Vol. 018, No. 188 (E-1532), Mar. 31, 1994 & JP-A 05 344755 discloses a drive circuit for a piezoelectric element for driving a fuel valve. There, the piezoelectric element is charged via a first regulated voltage with a constant charge amount, and is entirely discharged to a regulated second negative voltage via a capacitance determination of the piezoelectric element of the voltage measured at discharge.

SUMMARY OF THE INVENTION

It is accordingly an object of the invention to provide a drive system for a capacitive actuator, which overcomes the above-mentioned disadvantages of the heretofore-known devices and methods of this general type without using a temperature sensor, such that a maximally constant displacement ds is achieved throughout the entire temperature range in which the actuator is operated. A further object of the invention is to provide a device for carrying out the method.

With the foregoing and other objects in view there is provided, in accordance with the invention, a method of driving a capacitive actuator, in particular a piezoelectrically operated fuel injection valve of an internal combustion engine. The method comprises the following steps:

predetermining an amount of energy required for a particular actuator displacement and defining a charging setpoint;

charging the actuator from a power source and multiplying a current flowing into the actuator and a voltage drop across the actuator with one another to form a product;

integrating the product with respect to time to form an integration value; and terminating the charging step when the integration value reaches or exceeds the charging setpoint.

In an alternative mode of the invention, the method comprises the following steps:

predetermining an amount of energy required for a particular actuator displacement and defining a charging setpoint;

charging the actuator with a predetermined constant current;

integrating a voltage across the actuator with respect to time during the charging step to form an integration value; and terminating the charging step when the integration value reaches or exceeds the charging setpoint.

With the above and other objects in view there is also provided, in accordance with the invention, a device for driving a capacitive actuator such as, in particular, a piezoelectrically operated fuel injection valve of an internal combustion engine. The device comprises:

a voltage source having a positive terminal and a negative pole;

a series circuit connected between the positive terminal and the negative terminal of the voltage source, the series circuit comprising a current-limiting element, an electronic switch, and an actuator to be driven;

a control circuit connected to the electronic switch, the control circuit having an input receiving a control signal defining a start, a duration, and an end of a drive process, an input receiving a signal representing a current supplied to the actuator and an input receiving a signal representing a voltage across the actuator, the control circuit turning the switch on in response to the control signal;

the control circuit including:

a multiplier element for multiplying the current with the voltage to form a product;

an integrator for integrating the product to form an integration value; and a comparator for comparing the integration value with a predetermined setpoint; and the control circuit turning the switch off when the integration value reaches or exceeds the predetermined setpoint.

In accordance with an added feature of the invention, the control signal has a switching edge, and the integrator is discharged by the switching edge of each control signal.

In an alternative embodiment of the invention, there is provided a device for performing the above-noted alternative mode of the novel method. The device comprises:

a voltage source having a positive terminal and a negative pole;

an electronic switch and an actuator to be driven connected in series between the positive terminal and the negative pole of the voltage source;

a constant-current source connected for charging the actuator;

a control circuit having an input for receiving a control signal for a start, a duration, and an end of a drive process, and an input receiving a signal representing a voltage across the actuator, the control circuit turning on the switch at a start of the control signal;

the control circuit including:

an integrator for integrating the signal representing the voltage across the actuator to form an integration value; and a comparator for comparing the integration value with a predetermined setpoint; and the control circuit turning the switch off when the integration value reaches or exceeds the predetermined setpoint.

Studies have shown that the energy fed to a capacitive actuator represents a very much more precise measure of the displacement ds than the applied voltage, and that charging with constant energy over the requisite temperature range leads to a substantially more constant displacement. The displacement varies approximately linearly with the applied voltage at a particular temperature. If the temperature changes, then the displacement for the same voltage changes. On the other hand, the displacement varies proportionately to the square of the applied energy (ds≈e$^2$), but independently of the temperature.

In mass-produced piezo stacks, the thicknesses of the individual piezo layers are not exactly equal. It is possible, for example, to produce stacks having constant length s but a different number of layers. Such different stacks may then also come to be used if a defective fuel valve is replaced by another one. When such different stacks are charged with constant voltage, different displacements ds result even when the temperature is the same.

An advantage of the drive method according to the invention is that, when the actuator is charged with constant energy, such different stacks have a virtually identical, constant displacement ds not only at a specific temperature, but also over the entire temperature range numerically indicated above.

A further advantage of the drive method according to the invention is that, by determining the energy supplied to the actuator—not of the charge drawn from a supply source or a capacitor—all changes of the circuit due to temperature changes, humidity, component tolerances, aging etc. are considered when measuring or allocating the energy supply. Other features which are considered as characteristic for the invention are set forth in the appended claims.

Although the invention is illustrated and described herein as embodied in method and device for driving a capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
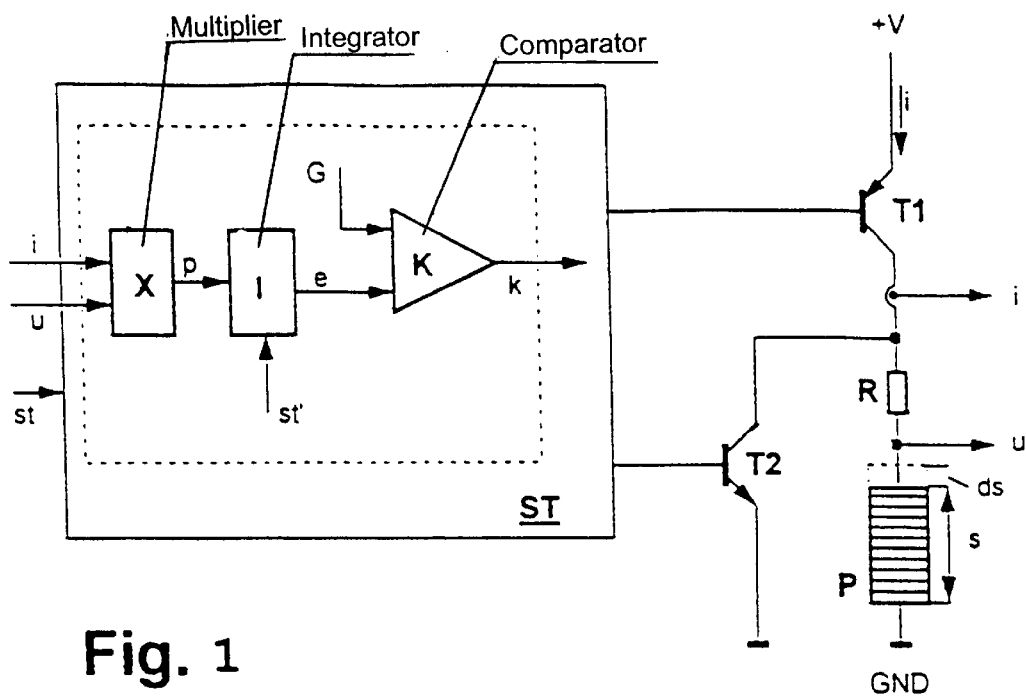
FIG. 1 is a schematic circuit diagram of a first embodiment of the invention.

Referring now to the figures of the drawing in detail and first, particularly, to FIG. 1 thereof, there is seen a first embodiment for driving a piezoelectric actuator P of a non-illustrated fuel injection valve via a microprocessor-controlled control circuit ST.

A power source V includes a positive pole +V and a negative pole GND. A series circuit is connected between the positive pole +V and the negative pole GND. The series circuit consists of an electronic switch T1, controlled by the control circuit ST, of a current limiting element, for example a resistor R (or a coil), and of a piezo actuator P of the fuel injection valve. The piezo actuator P has a length s. A further electronic switch T2 is connected in parallel with a series connection of the piezo actuator P and the resistor R.

The electronic transistor switches T1 and T2 are driven by the control circuit ST, which receives an external control signal st for the injection time, for example from a motor control unit (in which the control circuit may also be integrated). Furthermore, when the switch T1 is turned on, a current i which flows into the piezo actuator P and is limited by the resistor R, and the voltage drop u across the piezo actuator P are measured and fed to the control circuit ST as further input values.

A multiplier element X, an Integrator In and a comparator K are connected in series in the control circuit ST (they are enclosed in a dashed box within the control circuit ST). The output of the multiplier element X is connected to the input of the Integrator In, and the output of the latter is connected to one input of the comparator K. The other input of the comparator K receives a setpoint G defining the desired amount of energy.

Referring now to the flowchart of FIG. 3, a method of operating the circuit of FIG. 1 will now be described. It will be understood that the method is also applicable and may be employed for the circuit shown in FIG. 2 (described further below). We starting from an initial state (state 0) in which both switches T1 and T2 are off. T1=0 means off; T1=1 means on. The same holds for T2. For the signals st and k, "1" means that they are present, "0" means that they are not present.

At the starting of a control signal st, which changes from 0 to 1 (state 1), the switch T1 is turned on. A current i, limited by the resistor R, therefore starts to flow from the positive pole +V of the voltage source, via the switch T1 and the piezo actuator P, to the negative pole GND. The voltage u is set up across the piezo actuator P: the piezo actuator extends by a displacement ds to a length s+ds and opens the injection valve (state II). At this point fuel is injected. In response to a leading edge st' of the control signal st, the Integrator In is simultaneously discharged. At the start of each injection process, its output signal is accordingly e=0.

The measured values i and u that are input into the control circuit ST are multiplied with one another in the multiplier element X, and the product p appearing at its output is subsequently integrated in the Integrator In which has just been discharged. The output signal e of the Integrator In is proportional to the energy supplied to the piezo actuator P. The integrated signal e is fed to the comparator K in which it is compared with the setpoint G. As soon as e reaches or exceeds the setpoint, the comparator outputs a digital output signal k=1 (state III). The comparator output signal k=1 causes the control circuit ST to turn off the switch T1 (state IV), which terminates the charging process of the piezo actuator P.

The actuator has reached the desired displacement ds and the fuel injection valve has therefore opened sufficiently, as a result of which, owing to constant fuel pressure, the amount of fuel injected is proportional to the open time of the actuator. The fuel injection valve remains opened with the displacement ds assigned to the applied energy signal e, until the control signal st ceases, st=0 (state V).

If the control signal becomes st=0, the switch T2 is turned on by the control circuit ST (state VI), as a result of which the piezo actuator is discharged via the resistor R and the fuel injection valve closes. This completes the injection process. The next, and all further injection processes, are carried out in the same way.

Figure 2:
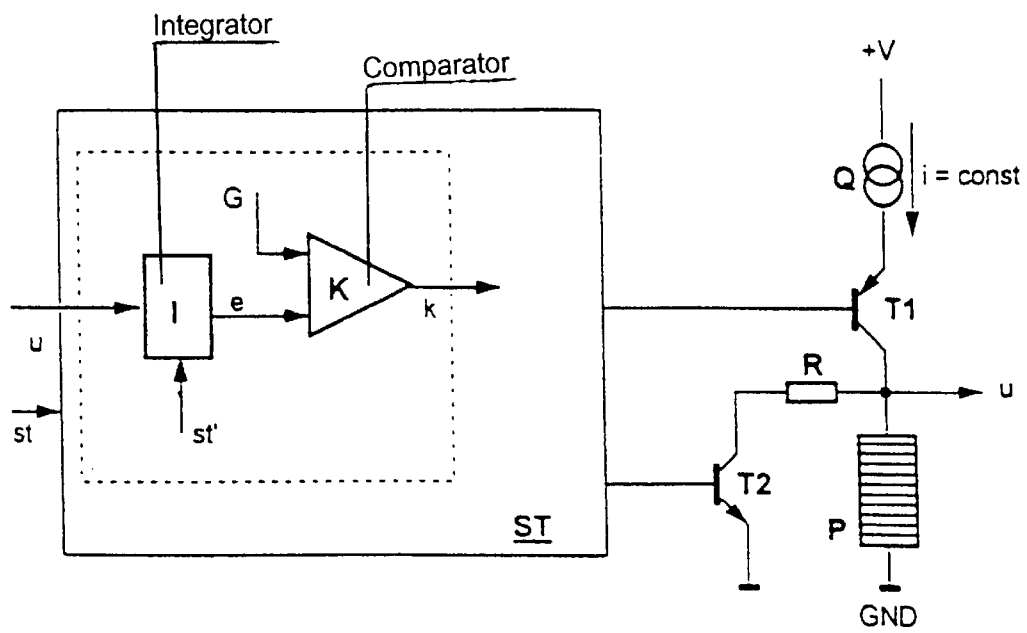
FIG. 2 is a schematic circuit diagram of a second embodiment of the invention.
Figure 3:
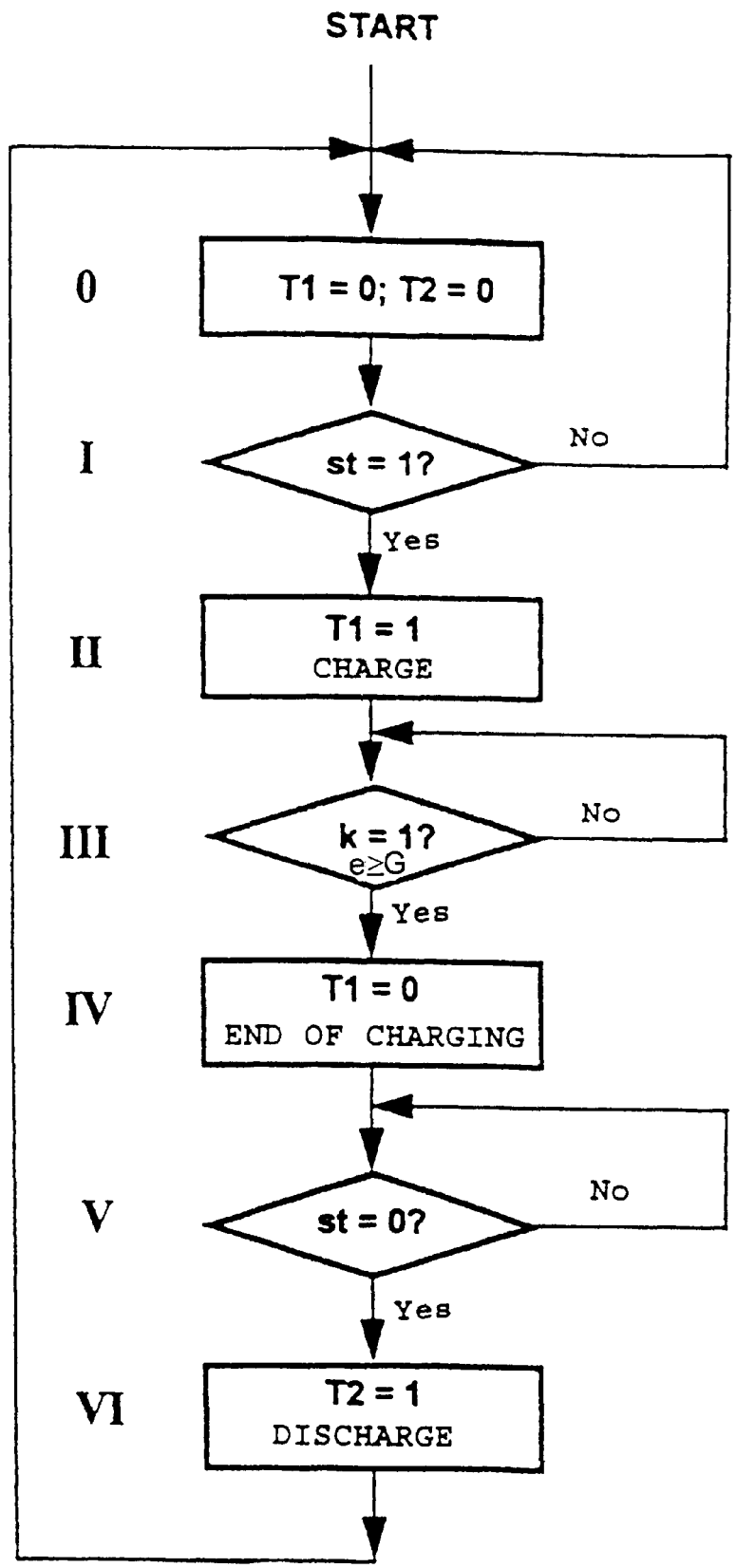
FIG. 3 is a flow chart illustrating the mode of operation of the circuits according to FIGS. 1 and 2.

FIG. 2 illustrates a simplified embodiment of the circuit described in the invention. The second embodiment is modified from the circuit according to FIG. 1 to the extent that a constant-current source Q is inserted into the current path of the piezo actuator P and charges the piezo actuator P with a constant current i=const. Owing to the known current intensity, the current measurement may be omitted, as well as the elaborate multiplication u*i and the multiplier element X. The input value u of the control circuit ST, which is the only one apart from the control signal st, is fed to the Integrator In whose output signal e is proportional to the stored energy. In other regards, the function of the circuit corresponds to that according to FIG. 1. The resistance or the current-limiting element is here needed merely to limit the discharge current and is therefore connected between the piezo actuator P and the switch T2.

We claim:

1. A method of driving a capacitive actuator, which comprises:
    predetermining an amount of energy required for a particular actuator displacement and defining a charging setpoint;
    charging the actuator from a power source and multiplying a current flowing into the actuator and a voltage drop across the actuator with one another to form a product;
    integrating the product to form an integration value proportional to the energy applied to the capacitive actuator; and
    terminating the charging step when the integration value reaches or exceeds the charging setpoint.

2. The method according to claim 1, wherein the actuator is a piezoelectrically operated fuel injection valve of an internal combustion engine.

3. A method of driving a capacitive actuator, which comprises:
    predetermining an amount of energy required for a particular actuator displacement and defining a charging setpoint;
    charging the actuator with a predetermined constant current;
    integrating a voltage across the actuator during the charging step to form an integration value proportional to the energy applied to the capacitive actuator; and
    terminating the charging step when the integration value reaches or exceeds the charging setpoint.

4. The method according to claim 2, wherein the actuator is a piezoelectrically operated fuel injection valve of an internal combustion engine.

5. A device for driving a capacitive actuator, comprising:
    a voltage source having a positive terminal and a negative terminal;
    a series circuit connected between said positive terminal and said negative terminal of said voltage source, said series circuit comprising a current-limiting element, an electronic switch, and an actuator to be driven;
    a control circuit connected to said electronic switch, said control circuit having an input receiving a control signal defining a start and an end of a drive process, an input receiving a signal representing a current supplied to the actuator and an input receiving a signal representing a voltage across the actuator, said control circuit turning said switch on in response to the control signal;
    said control circuit including:
        a multiplier element for multiplying the current with the voltage to form a product;
        an integrator for integrating the product to form an integration value proportional to the energy applied to the capacitive actuator; and
        a comparator for comparing the integration value with a predetermined setpoint; and
    said control circuit turning said switch off when the integration value reaches or exceeds the predetermined setpoint.

6. The device according to claim 5, wherein the actuator is a piezoelectrically operated fuel injection valve of an internal combustion engine.

7. The device according to claim 5, wherein the control signal has a switching edge, and said integrator is discharged by the switching edge of each control signal.

8. A device for driving a capacitive actuator, comprising:
    a voltage source having a positive terminal and a negative terminal;
    an electronic switch and an actuator to be driven connected in series between said positive terminal and said negative terminal of said voltage source;
    a constant-current source connected for charging the actuator;
    a control circuit having an input for receiving a control signal for a start and an end of a drive process, and an input receiving a signal representing a voltage across the actuator, said control circuit turning on said switch at a start of the control signal;
    said control circuit including:
        an integrator for integrating the signal representing the voltage across the actuator to form an integration value proportional to the energy applied to the capacitive actuator; and
        a comparator for comparing the integration value with a predetermined setpoint; and
    said control circuit turning said switch off when the integration value reaches or exceeds the predetermined setpoint.

9. The device according to claim 8, wherein the control signal has a switching edge, and said integrator is discharged by the switching edge of each control signal.

10. The device according to claim 8, wherein the actuator is a piezoelectrically operated fuel injection valve of an internal combustion engine.

* * * * *